April 5 1932.  C. F. WRAY  1,853,010
PIPE HANGER
Filed Dec. 24, 1929  2 Sheets-Sheet 1
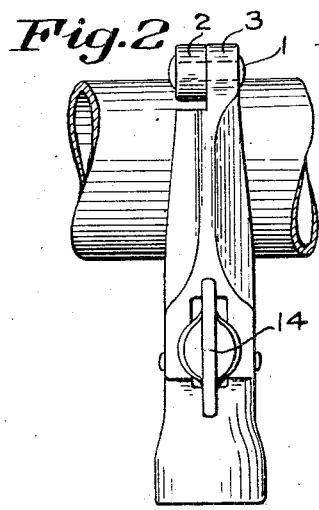
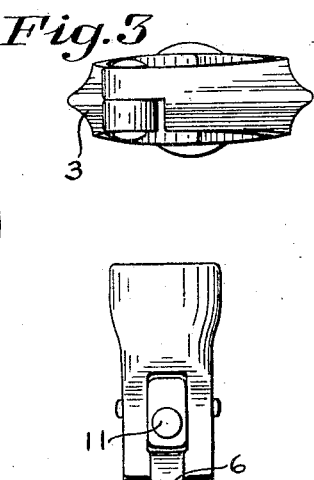
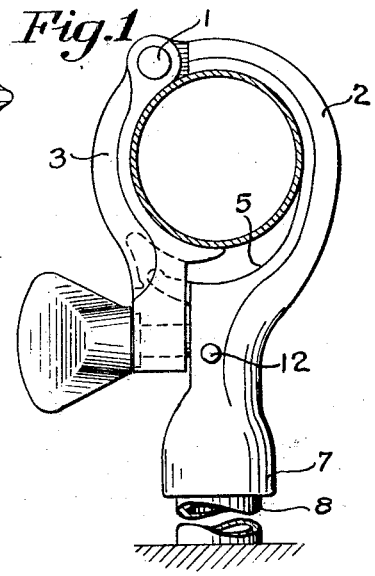
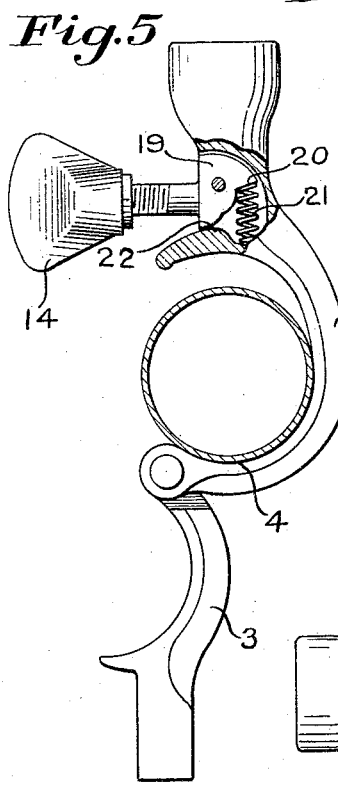
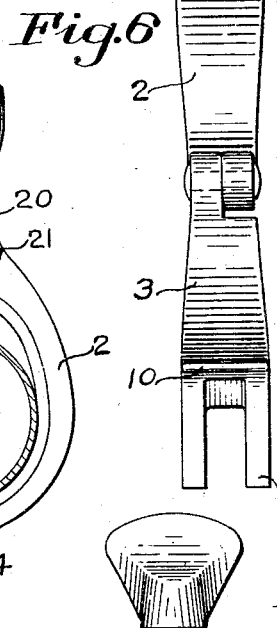
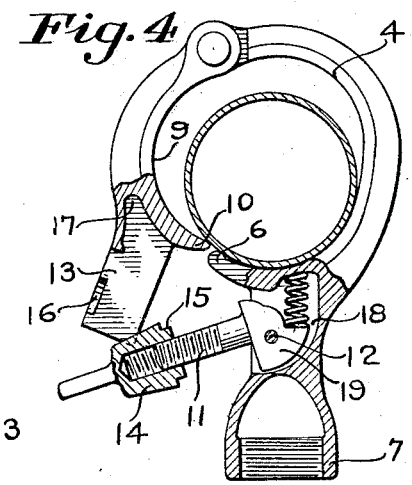
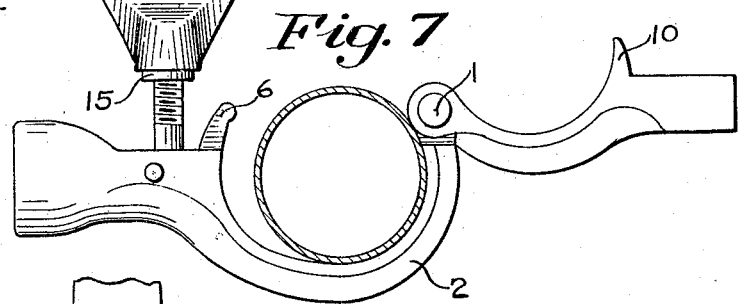
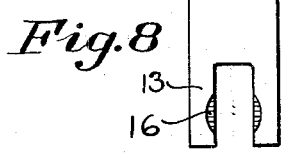
INVENTOR
Charles F. Wray
Harold R. Stonebraker
his ATTORNEY April 5 1932.    C. F. WRAY    1,853,010
PIPE HANGER
Filed Dec. 24, 1929    2 Sheets-Sheet 2

INVENTOR
Charles F. Wray
BY
Harold E. Stonebraker
his ATTORNEY

Patented Apr. 5, 1932

1,853,010

UNITED STATES PATENT OFFICE

CHARLES F. WRAY, OF ROCHESTER, NEW YORK, ASSIGNOR TO NATIONAL BRASS MANUFACTURING COMPANY, OF ROCHESTER, NEW YORK, A CORPORATION OF NEW YORK

PIPE HANGER

Application filed December 24, 1929. Serial No. 416,225.

The invention relates to a pipe hanger and has for its purpose to provide a structure of simple form and which is practicable and efficient, and affords a quickly detachable connection for removably holding a pipe.

A more particular object of the invention is to afford a device which may be suspended from or may extend upwardly from a support, or be arranged with its longitudinal axis in horizontal position, and in any of such positions permits easy and quick positioning or removal of a pipe as desired.

Another purpose of the invention is to afford a structure enabling an operator to easily position a pipe therein and which safely supports the pipe until it is tightly clamped, leaving the hands of the operator free to manipulate the retaining devices.

Another object of the invention is to construct a pipe hanger for temporarily suspending a pipe and provided with resilient means on one of a pair of clamping members for automatically engaging the other.

To these and other ends, the invention comprises the structure that will appear clearly from the following description when read in conjunction with the accompanying drawings, the novel features being pointed out in the claims following the specification.

In the drawings:

Figure 1 is a side elevation of a preferred embodiment of the invention illustrating in section a pipe clamped therein, the hanger being here shown as extending upwardly from its support;

Figure 2 is a front elevation of the same;

Figure 3 is a plan view;

Figure 4 is a side elevation partly in section of the construction illustrated in Figures 1 to 3, showing a pipe supported in one clamping member and the movable clamping member as it is about to be brought into clamping relation with the pipe;

Figure 5 is a side elevation of the construction when suspended from a support, showing a pipe in position, before elevating the movable clamping member;

Figure 6 is a front elevation of the structure shown in Figure 5 with the pipe and retaining nut removed;

Figure 7 is a side elevation with the hanger arranged horizontally and the clamping members disengaged from a pipe;

Figure 8 is a detail elevation of the yoke on one of the clamping members;

Figure 10:
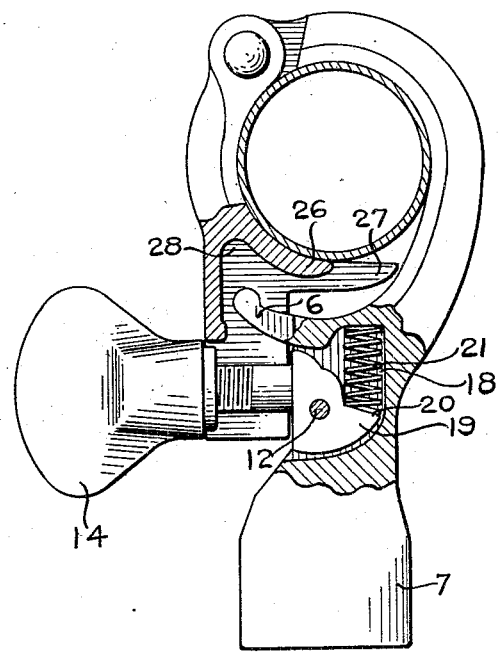
Figure 10 is a similar view, parts being sectioned away to show underlying parts.

The structure is intended especially for supporting pipes used in connection with liquid food products where it is frequently necessary to remove the pipes for sanitation, or in other relationships where it is essential to remove or position a pipe quickly and to clamp it firmly in position, and according to one embodiment of the invention as herein illustrated, the invention comprises a pair of clamping members which are hinged together at 1 and are designated generally at 2 and 3. The clamping member 2 includes a pipe engaging or clamping surface 4 that preferably merges into or terminates in a pipe supporting surface 5. The latter terminates in a pipe supporting lug 6, so that the surface 5 and lug 6 cooperate to hold a pipe while bringing the other clamping member into operative position, as illustrated in Figure 4.

The clamping member 2 is stationary, terminating at its lower end in an interiorly threaded collar 7 that is intended to engage a suitable stationary support 8 to hold the hanger in upright position, as shown in Figures 1, 2 and 4. The movable clamping member 3 includes a pipe engaging surface 9 that terminates in a pipe lifting portion or lug 10 which cooperates with the pipe as said clamping member is forced inwardly, moving the pipe upwardly from the position shown in Figure 4 to that shown in Figure 1, whereupon the clamping members are secured together by suitable retaining means. The latter preferably comprises a threaded bolt 11 that is pivoted at 12 to the clamping member 2 and engages the opening in a yoke 13 carried by clamping member 3. 14 designates a nut that threads on the bolt 11, engaging the outer face of the yoke 13, as shown in Figures 1 and 2, and thereby holding the clamping members tightly together. The nut has a reduced portion 15 engageable in the recesses 16 formed in the yoke.

To remove the pipe, the nut 14 is loosened, permitting the bolt 11 to be moved downwardly to the position shown in Figure 4, whereupon the clamping member 3 can be swung outwardly and the pipe easily removed. 17 designates a recess or pocket formed in the lower part of the clamping member 3 to receive the supporting lug 6 as shown in dotted lines in Figure 1 when the parts are in clamped position. The arrangement is such that the lug 10 just clears the lug 6 as the clamping member 3 is swung inwardly, as illustrated in Figure 4.

When desired, the hanger can be suspended as illustrated in Figure 5, in which case the pipe is supported in the manner shown by the clamping member 2 until the clamping member 3 can be swung upwardly into clamping relationship. During this upward swinging movement, the extreme end of the clamping member 3 rides under nut 14, swinging the latter together with the bolt 11 upwardly so that the clamping members 3 can readily move into clamping position. Thereupon the bolt 11 and nut 14 drop into engagement with the yoke 13 and the parts are ready for tightening the nut to hold the clamping members together.

In some cases it is desirable to arrange the hanger with its longitudinal axis horizontally, as shown in Figure 7, in which case the pipe is supported in the clamping member 2 in the manner illustrated, while the clamping member 3 is swung over to clamping position, after which the nut 14 is tightened. In all three positions of the hanger, there is always provision for supporting the pipe while the movable clamping member is brought into clamping position, so that the operator does not have to hold the pipe manually. In each instance, the positioning portion or lug 10 of the movable clamping member 3 actuates the pipe toward the clamping surface of the other clamping member where it is firmly retained. Thus is afforded an economical and extremely efficient and practical construction in which all the desired functions are performed in any one of the three positions in which the hanger may be located.

Since it is particularly desirable that the hands of the operator be as free as possible when a pipe is being positioned in the hanger or removed therefrom, means have been provided for automatically engaging the nut 14 with the yoke 13 when the clamping member 3 is moved to engage the pipe. To this end, the clamping member 2 is provided with a recess 18 in which the bolt 11 is pivoted. At its inner end the bolt 11 is provided with a block 19 which bears on the pivot 12 and is arranged in the recess 18. The block 19 is provided with a heel or abutment 20, and arranged between this abutment and the wall of the recess is an expansion coiled spring 21. The spring 21 operates to swing the bolt toward the clamping member 3 until a stop 22 on the block engages the clamping member 4 or the lug 6 formed integral therewith, at which time the bolt is arranged in a position at substantially right angles to the shank or collar 7, as shown in Figure 5. When the clamping member 3 is moved to engage the pipe, the yoke 13 engages the nut 14 and swings the bolt 11 on its pivot, tensioning the spring, until the yoke passes under the nut when the spring reacts to automatically move the bolt into the yoke. The nut may then be tightened to secure the clamping members in clamping engagement with the pipe.

Figure 9:
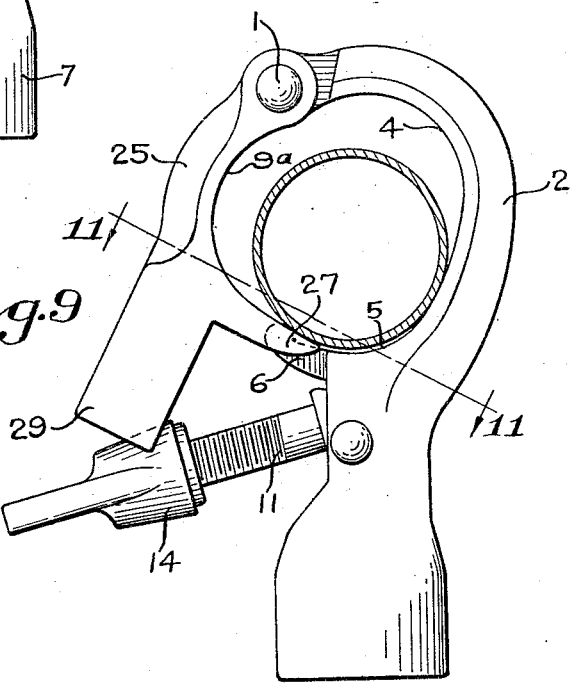
Figure 9 is a side elevation of a pipe hanger illustrating a modified construction.
Figure 11:
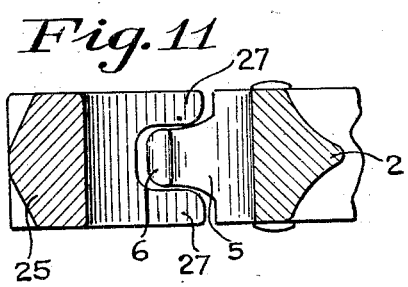
Figure 11 is a section on line 11—11 of Figure 9 looking in the direction of the arrows at said line.

Referring now to the embodiment illustrated in Figures 9, 10 and 11, the general arrangement of the parts is similar to that shown in Figures 1 to 8 previously described, and comprises a clamping member 2 having a pipe supporting surface 5 which terminates in a pipe supporting lug 6. The clamping member 2 is provided with a recess 18 at its base in which is pivoted the block 19 on which the outwardly extending bolt 11 is carried. The spring 21 is arranged between the wall of the recess and the heel or abutment 20 on the block and serves to resiliently maintain the bolt 11 in the horizontal position shown in Figure 10, or substantially at right angles to the shank 7 formed on the clamping member 2.

Cooperating with the free end of the bolt 11 is the thumb nut 14, which in turn cooperates with the free end of a clamping member 25, pivoted at 1 to the free end of the clamping member 2. The clamping member 25 has a pipe engaging surface 9ª similar to the pipe engaging surface 9 of the clamping member 3, and which terminates in a pipe lifting or engaging portion 27. The pipe lifting portion 27 is elongated and bifurcated at its end, as clearly shown in Figure 11, so that when moved into engagement with a pipe in the clamping member 2, as shown in Figure 9, the part 27 moves past the sides of the lug 6 and engages the pipe on opposite sides thereof, thus affording greater contact with the pipe and greater supporting surface therefor. It will also be noted that by this arrangement, the clamping member 25 is adapted to engage the pipe at a lower point, thus reducing the power required to raise the pipe to clamping position. The clamping member 25 has a recess or pocket 28 formed therein which receives the supporting lug 6 when the parts are in clamping position. The outer wall of this recess is bifurcated at its lower end to form a yoke 29 which cooperates with the nut 14 when the parts are in the clamping position shown in Figure 10.

It will be noted that the bolt 11 is mounted on the block 19 eccentrically thereto and extends therefrom normally in a direction at substantially right angles to the action of the spring, as seen in Figures 5 and 10. By this arrangement, the bolt 11 may swing bodily about the pivot 12 against the action of its spring.

While the invention has been described with reference to two particular embodiments, it is not restricted to the details herein disclosed, and this application is intended to cover any modifications or departures coming within the intent of this improvement or the scope of the following claims.

I claim:

1. A pipe hanger comprising a pair of cooperating clamping members hinged together, one of said clamping members including a clamping surface and a supporting surface that is spaced from the pipe when the latter is in clamped position, and means for holding the clamping members together.

2. A pipe hanger comprising a pair of cooperating clamping members hinged together, one of said clamping members including a curved clamping surface which merges into a curved supporting surface spaced from a pipe when clamped therein and serving to support a pipe when the other clamping member is disengaged, and means for holding the clamping members together.

3. A pipe hanger comprising a pair of cooperating clamping members hinged together, one of said members including a clamping surface and a supporting surface that is spaced from a pipe when the latter is in clamped position, said pipe supporting surface being adapted to hold a pipe when the other clamping member is disengaged and terminating in a supporting lug, the other clamping member including a pipe positioning portion movable inwardly of said pipe supporting lug, the latter clamping member having a recess to receive said pipe supporting lug, and means for retaining the clamping members together.

4. A pipe hanger including a pair of cooperating clamping members hinged together, one of said clamping members including a clamping surface and a supporting surface, and means carried by the other clamping member operative to lift a pipe into engagement with said clamping surface.

5. A pipe hanger comprising a pair of cooperating clamping members hinged together and having clamping surfaces which conform substantially to the periphery of a pipe when in clamped position, one of said clamping members including a curved supporting surface that is spaced from the pipe when the latter is in clamped position.

6. A pipe hanger comprising a pair of cooperating clamping members hinged together, one of said clamping members including a clamping surface terminating in a pipe lifting portion, and the other of said clamping members including a clamping surface and a supporting surface, the latter being spaced from the pipe when in clamped position and terminating in a supporting lug that is located outwardly from said pipe lifting portion when the parts are in clamping position, the first mentioned clamping member having a recess to receive said supporting lug, and means for holding the clamping members together.

7. A pipe hanger comprising a pair of clamping members hinged together, one of said clamping members including a pipe clamping surface terminating in a pipe lifting portion, a yoke having a recess therein, the other of said clamping members including a pipe clamping surface and a pipe supporting surface, the latter terminating in a supporting lug that is spaced from a pipe and positioned in the aforesaid recess when the parts are in clamped position, a retaining bolt pivoted to the last mentioned clamping member and cooperating with the aforementioned yoke, and a nut engaging said yoke and bolt for retaining the clamping members together.

8. A pipe hanger comprising a pair of clamping members movable into cooperative engagement with a pipe, a yoke on one of said members, a retaining device on the other of said members, and resilient means for moving the retaining device into engagement with the yoke when the clamping members are moved toward each other.

9. A pipe hanger comprising a pair of cooperating clamping members hinged together, one of said clamping members including a yoke at its free end, a retaining device movably mounted on the other of said clamping members, and resilient means engaging said retaining device to hold it in the path of movement of the yoke when its clamping member is moved to clamping engagement with a pipe.

10. A pipe hanger comprising a pair of cooperating clamping members hinged together, and means for retaining them in clamping engagement with a pipe, said means comprising a retaining member pivoted in one of the clamping members, an abutment on the retaining member, a spring arranged between the abutment and the clamping member, and a stop for limiting the movement of the retaining member under the action of said spring.

11. A pipe hanger comprising a pair of cooperating clamping members, one of said clamping members including a clamping surface merging into a supporting surface that is spaced from the pipe when the latter is in clamped position, the other of said members including a pipe engaging portion, a retaining device on the first of said members adapted to engage the second of said members, and means on said retaining device for moving the second clamping member into clamping engagement with the pipe and the pipe into engagement with the clamping surface on the first of said clamping members.

12. A pipe hanger comprising a pair of cooperating clamping members hinged together, one of said clamping members having a yoke at its free end, a block pivotally mounted in the other of said clamping members, a retaining member mounted on the block so as to swing bodily when the block turns on its pivot, and resilient means engaging the block to swing the retaining member into engagement with said yoke.

13. A pipe hanger comprising a pair of cooperating clamping members hinged together and having clamping surfaces which conform substantially to the periphery of a pipe when in clamped position, one of said clamping members comprising a supporting portion terminating in a projecting lug, the other of said members comprising a bifurcated pipe engaging portion adapted to engage the pipe on opposite sides of the lug, a retaining device on one of the clamping members adapted to engage the other of said clamping members, and means on said retaining device for moving said other clamping member and the pipe into clamping engagement with the pipe, the bifurcated portion engaging the bottom of the pipe at a point spaced from the pipe supporting portion of the first mentioned clamping member.

14. A pipe hanger including a pair of cooperating clamping members hinged together, one of said clamping members including a clamping surface and a supporting surface, and a bifurcated part on the other clamping member adapted to move into engagement with the pipe on both sides of said supporting surface to lift the pipe therefrom into engagement with said clamping surface.

In witness whereof, I have hereunto signed my name.

CHARLES F. WRAY.